J. P. MILLER.
Fruit Dryer.
No. 109,234. Patented Nov. 15, 1870.
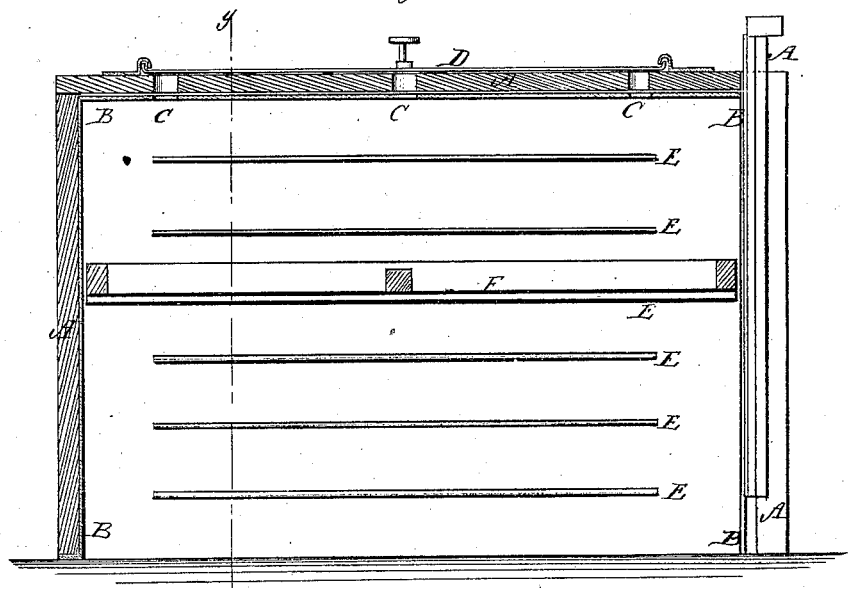
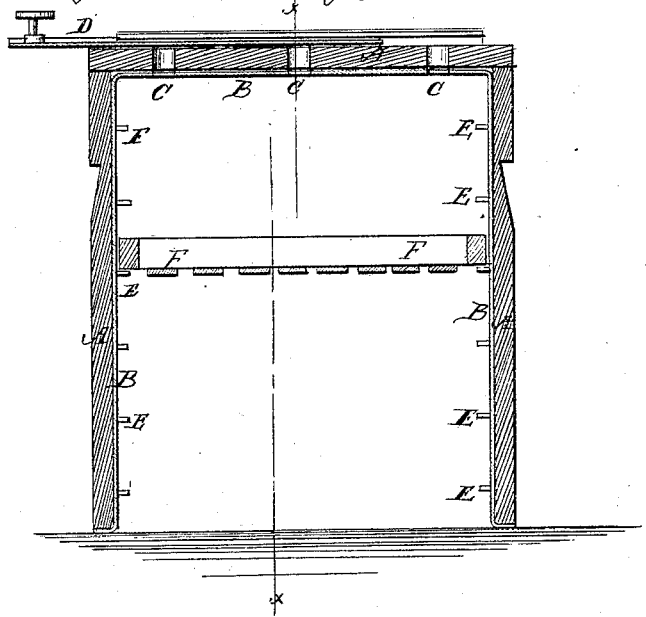
Witnesses:
Chas. Nida.
L. S. Mpaber
Inventor:
J. P. Miller
Per Munn & Co
Attorneys.

United States Patent Office.

JOHN P. MILLER, OF SOMERVILLE, NEW JERSEY.

Letters Patent No. 109,234, dated November 15, 1870.

IMPROVEMENT IN DRIERS.

The Schedule referred to in these Letters Patent and making part of the same.

*To all whom it may concern:*

Be it known that I, JOHN P. MILLER, of Somerville, in the county of Somerset and State of New Jersey, have invented a new and useful Improvement in Family Fruit-Drier; and I do hereby declare that the following is a full, clear, and exact description thereof, which will enable others skilled in the art to make and use the same, reference being had to the accompanying drawing forming part of this specification, in which—

Figure 1 is a vertical longitudinal section of my improved fruit-drier, taken through the line $x\,x$, fig. 2.

Figure 2 is a vertical cross-section of the same, taken through the line $y\,y$, fig. 1.

Similar letters of reference indicate corresponding parts.

My invention has for its object to furnish a simple, cheap, and convenient fruit-drier or kiln, which shall be so constructed and arranged as to enable the heat in the stove, when the cooking is finished, and which has hitherto been wasted, to be utilized in drying the fruit for the family or for market, so that each one may furnish himself with, or prepare for market, a supply of clean and wholesome, perfectly dried fruit at scarcely any expense; and It consists in the drier constructed as hereinafter more fully described.

A is the outer case of the drier, which is made of wood, as being an imperfect conductor of heat. The interior of the case A is lined with tin or other suitable sheet metal, the lower edge of which lining should extend beneath the lower edge of the box or case A, to prevent the wood from coming in contact with the stove upon which the drier is to be placed when being used.

One end of the box A B is made so as to be slid out, as shown in fig. 1, or otherwise conveniently opened, to allow access to be had to the drier without removing it from the stove.

The top of the box A B has a number of holes, C, formed in it, to allow the steam and moisture from the fruit to escape.

The part of the top of the drier in which the holes C are formed is covered with a sliding plate, D, to enable some or all of the holes C to be covered or closed when desired, according as the kind of fruit being dried or the stage of the drying process may require.

Upon the inner surface of the sides of the box A B are formed flanges or ribs E, to receive the grates or racks F upon which the fruit to be dried is placed.

The sides or frame of the racks F may be made of wood or other suitable material, and the bottom of said racks F may be strips of wood, strips of tin, or other suitable sheet metal, or wire or wire-cloth, as may be desired or convenient.

Six (more or less) of the grates or racks may be used, according to the size of the drier, or as the amount of fruit to be dried may require.

In using the drier the fruit is spread upon the racks F, which are placed upon the flanges E of the box A B, and the removable end or door is closed. Then, when the stove is no longer required for cooking, the boiler-holes of the said stove are closed with their covers, and the drier is placed upon the top of the stove. A slow fire may be kept up, if desired, by means of cinders, chips, old wood, or other fuel.

Having thus described my invention,

I claim as new and desire to secure by Letters Patent—

An improved fruit-drier, consisting of the wooden box or case A, sheet-metal lining B, holes C, sliding plate D, ribs or flanges E, and racks or grates F, said parts being constructed and arranged substantially as herein shown and described, and for the purpose set forth.

The above specification of my invention signed by me this 29th day of August, 1870.

JOHN P. MILLER.

Witnesses:
JAMES T. GRAHAM,
T. B. MOSHER.